C. C. & J. C. CORFMAN.
FEEDING TROUGH.
APPLICATION FILED MAR. 5, 1915.
1,188,250.
Patented June 20, 1916.
2 SHEETS—SHEET 1.
Fig. 1.
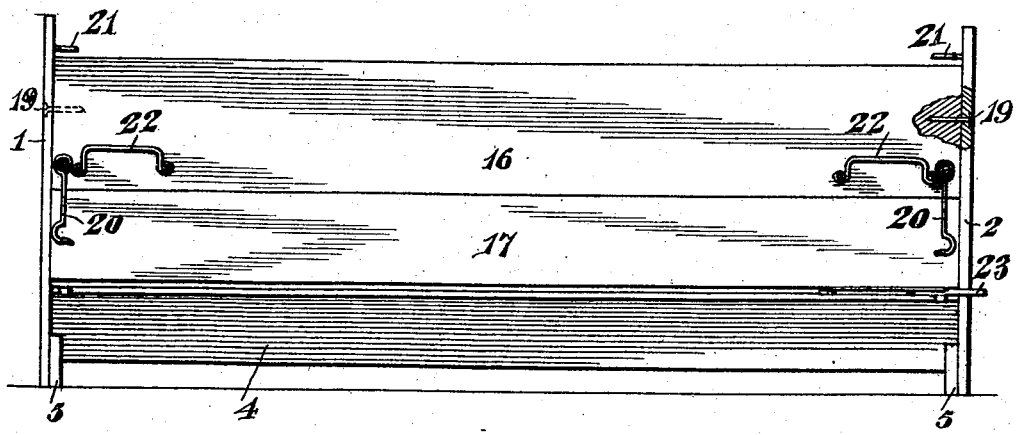
Fig. 3.
Fig. 6.
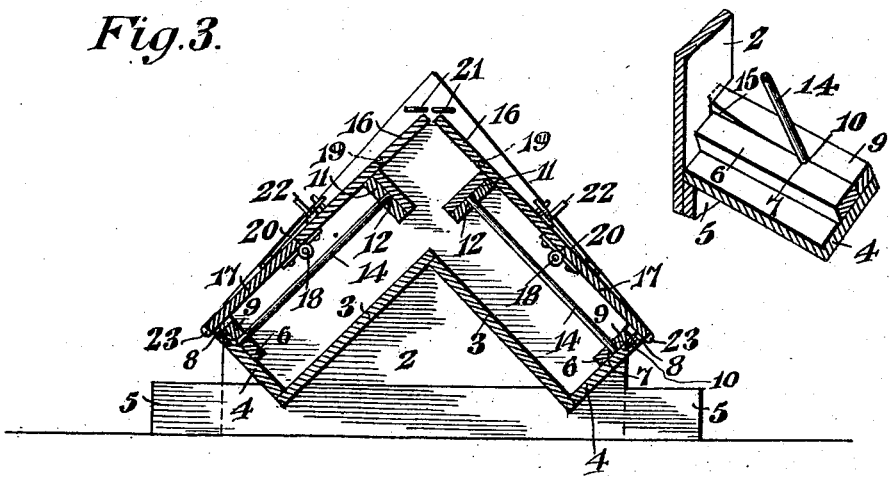
Witnesses
Jas. K. McCathran
F. T. Chapman
C. C. Corfman,
J. C. Corfman, Inventors
By E. G. Siggers
Attorney

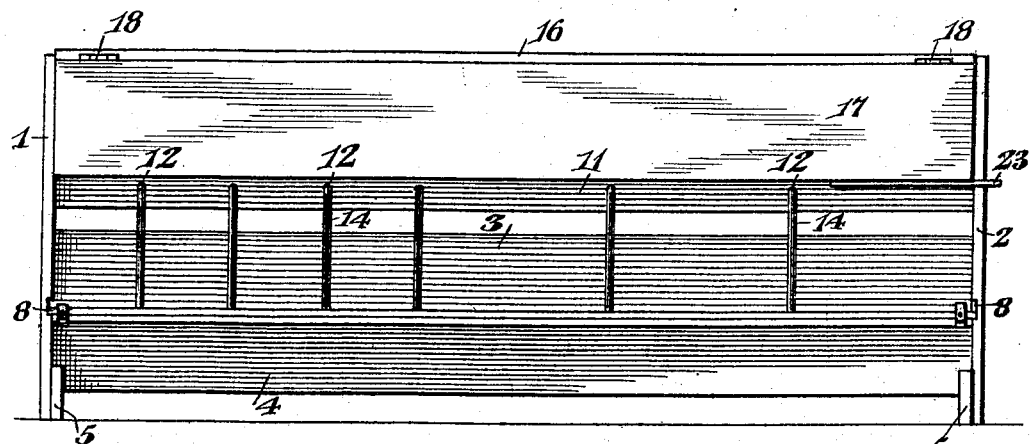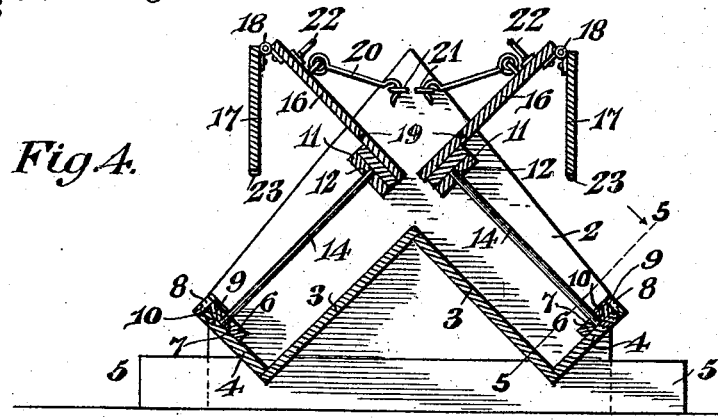

UNITED STATES PATENT OFFICE.

CLAIR C. CORFMAN AND JOSEPH C. CORFMAN, OF SYCAMORE, OHIO.

FEEDING-TROUGH.

1,188,250.  Specification of Letters Patent.  Patented June 20, 1916.

Application filed March 5, 1915. Serial No. 12,416.

*To all whom it may concern:*

Be it known that we, CLAIR C. CORFMAN and JOSEPH C. CORFMAN, citizens of the United States, residing at Sycamore, in the county of Wyandot and State of Ohio, have invented a new and useful Feeding-Trough, of which the following is a specification.

This invention has reference to feeding troughs for stock and is more particularly designed to provide a feeding trough for pigs, and its object is to provide a feeding trough whereby the trough may be kept closed when not in use, and when opened for feeding purposes the covers coact to provide a trough for directing the feed to the feeding racks.

Great trouble is usually encountered, especially in feeding hogs, because much feed is wasted, dirt gets into the trough, and generally unsanitary conditions prevail.

In accordance with the present invention the trough, which is made with a central ridge, is provided with cover members which when in the closed position completely cover all parts of the trough. These cover members are so disposed that in the open position the feed containing portions of the trough are exposed on opposite sides of the central ridge, and the cover members coact with each other and with the central ridge to produce a feed-receiving and directing funnel, so that the feed may be introduced and distributed without any interference from the presence of the animals. Moreover, provision is made for guard bars removably held in the trough to prevent the hogs from climbing into the trough during feeding time, and these bars may be so arranged that certain portions of the trough can be reserved for small pigs, since the bars may be placed so close together that the larger animals cannot gain access to the feed except at the points provided for the purpose, and so interference with smaller animals is prevented.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings: Figure 1 is a side elevation of the trough in the closed position, some parts being broken away to disclose features otherwise hidden. Fig. 2 is a similar view of the trough in the open condition. Fig. 3 is a cross-section of the trough in the closed position. Fig. 4 is a cross-section of the trough in the open position. Fig. 5 is a section on the line 5—5 of Fig. 4. Fig. 6 is a perspective view of a portion of one end of one side of the trough.

Referring to the drawings there is shown a double trough formed of end members 1, 2, inclined longitudinal inner members 3, and inclined longitudinal outer members 4, the members 3 together forming the back portions of the trough in the shape of a longitudinal ridge and the members 4 forming the front portions of the trough and rising to a less height than the back portions 3. The structure in reality forms a double or duplex trough on opposite sides of an upright central plane, and the end members 1 and 2 are continued to a greater height than the intermediate or ridge members 3. In order to give stability to the trough the end members 1 and 2 are provided with cross pieces 5 projecting beyond the sides of the trough, so that it may not be easily overturned, the trough being usually quite long with respect to its width.

On the inner face of each board or front member 4 near the upper edge of said member there is secured a longitudinal strip 6 along the outer edge of which there are produced notches 7 in suitably spaced relation. From the ends of the strips 6 to the outer edges of the boards 4 the inner walls of the ends 1 and 2 are channeled, as shown at 8, and these channels receive corresponding ends of other strips 9 serving to close the corresponding sides of the notches 7 and the strip 9 may have notches or recesses 10 matching the recesses 7 of the strip 6. At an appropriate distance from and parallel with the strips 6 and 9 and located on opposite sides of the upright central plane of the trough structure are other strips 11 provided with sockets 12 matching the combined notches 7 and 10. The strips 11 are arranged lengthwise of the trough and are secured at the ends to the end members 1 and 2 of the structure. Each strip 9 is held to its companion strip 6 by buttons 13, or in any other suitable manner, so that on being released by a suitable turning of the buttons the strips 9 are readily removed from engaging relation with the strips 6. Under such conditions the notches or recesses 7 are exposed and a suitable number of rods 14 are placed along the strips, one end of each rod seating in a socket 12 and the other end in a socket formed by the combined notches 7 and 10. The number of the notches and recesses is such that each trough may be supplied with as many rods 14 as may be needed to bring the rods in such close relation that only small animals may be enabled to get their heads between the rods. To permit larger animals to have ready access to the troughs certain of the rods may be omitted.

To facilitate placing of the strips or bars 9 without it being necessary to move both buttons 13 at the two ends of the bars, each bar may have one end beveled as shown at 15, so that it is readily put into place or removed from its seat by the simple expedient of moving one only of the buttons 13 out of the way.

Extending lengthwise of the trough on opposite sides of the latter are two doors or covers 16 each having a longitudinal section 17 connected to it by hinges 18. These doors 16 are each mounted in the ends 1 and 2 by pins 19 or other suitable means whereby the doors may each be turned on an axis longitudinal of the trough structure. The doors are of such width that when in the closed position the hinged sections 17 which are of less width than the main sections have their free or lower edges about coincident with and in covering relation to the upper outer edges of the front boards 6 of the trough sections. At the same time the upper edges of the doors are in closed relation at a short distance below the apexes of the end members 1, whereby the interiors of the troughs are closed against access.

When the doors are turned to the open position the hinged sections 17 are elevated until further movement is arrested by the engagement of the main members 16 with the strips 11, and in this position those faces of the doors 16 which ordinarily constitute the outer faces are now directed downwardly toward the upright central plane of the trough structure with the then lower adjacent edges spaced apart and immediately over the apex of the ridge formed by the boards 3. The cover members 16 are held in the elevated position by hooks 20, one for each cover member, and eyes 21 on one of the end members. If the trough be of considerable length it is advisable to provide hooks 20 at both ends of the cover member and eyes 21 on both end members 1 and 2, which arrangement is shown in Fig. 1. To facilitate the lifting and lowering of the cover members they are each provided with handle members 22.

Not only do the cover members serve to protect the contents of the troughs against access and to a large extent against weather conditions, but when the covers are in the open position they slant one toward the other and toward the central upright plane of the trough, so that they constitute a funnel into which the food intended for the animals may be deposited, and from which it is directed to the apex of the ridge formed by the boards 3 and distributed into the two troughs formed by respective boards 3 and 4 where the animals are enabled to gain access to the food, but without liability of getting into the troughs and without waste of the food.

The inverted V-shaped partition or ridge causes an approximately even division of the feed while the doors 16 which may be termed storm doors, keep out snow and rain and also prevent the animals from getting at the troughs when it is not desirable that they should do so. Because of the ease with which the feed may be deposited in the troughs from above the hogs cannot interfere therewith. When weather conditions permit the covers may be left open, thus thoroughly ventilating the trough, but the open covers in no wise interfere with the feeding and in fact facilitate the feeding, since these open covers serve as a directing means for the feed causing its even distribution into the oppositely-disposed troughs. Each hinged portion 17 of each door may be provided with a handle member 23 facilitating its manipulation.

What is claimed is:—

1. A double feed trough, comprising two end members, inclined longitudinal inner members meeting at their high edges, inclined longitudinal outer members rising from the lower edges of the longitudinal inner members and to a less height than the inner members, the said inner members forming the back portions of the double trough in the shape of a longitudinal ridge, and cover members for the respective troughs pivoted to the end members and when closed being in substantially parallel relation to the inner longitudinal members of the trough structure and reaching from the upper edges of the outer longitudinal members to a point of meeting above the ridge formed by the inner longitudinal members, said cover members being movable on their pivots into upstanding divergent relation to constitute a funnel above the ridge formed by the longitudinal inner members, said cover members having their pivots intermediate of their opposite edges and nearer to those edges constituting the upper edges in the closed position than to the opposite or lower edges, and the portions of the cover members between the pivots and those edges constituting the lower edges being divided into two longitudinal parts hinged together, whereby the lower hinged portions of the cover members hang pendently when the cover members are in the upwardly extending diverging position.

2. A feed trough comprising two feed receptacles placed back to back with the backs higher than the fronts and converging and meeting at a higher level than the fronts, and separate cover members for the respective troughs each of a width to extend from the upper edges of the fronts of the troughs to a line of meeting above the meeting line of the converging backs of the troughs, said covers being pivoted to turn from covering relation to the troughs into a position of rising divergence constituting a funnel over the meeting edges of the trough backs, each cover being formed of two members hinged together along a line parallel with the pivotal axis of the respective cover, and each receptacle having guards located to be between the respective cover member when closed and the back member of the respective trough.

3. An elongated feed trough structure having fixed feed receptacles on opposite sides of its longitudinal center line with the rear walls of the receptacles slanting upwardly one toward the other and meeting to form a longitudinal upstanding ridge, and covers for the respective troughs of a width to reach from a line of meeting above the upstanding ridge to the front walls of the troughs, said covers being pivoted at the ends intermediate of the opposite edges and nearer to the meeting edges than to the edges remote from the meeting edges to permit the movement of the covers into upstanding divergent relation with the adjacent edges spaced apart over the upstanding ridge, and each cover being formed of two members hinged together to provide a pendent flap in overhanging relation to a respective feed receptacle and restricting access thereto.

4. A feed trough provided with upstanding ends with feed receptacles extending between the ends, said receptacles having inclined inner members meeting at the high edges to form a longitudinally extended ridge and with inclined outer members in rising divergence from the lower edges of the rear members, and cover members pivoted at the ends to the end members of the trough section with the pivots spaced from adjacent edges of said cover members and the latter being of a width to reach from a line of meeting over the upstanding ridge to the upper edges of the outwardly inclined outer members and movable on the pivots into upstanding divergent relation with the meeting edges separated to constitute a funnel for discharging feed upon the ridge, said structure having strips extending between the end members higher than the upstanding ridge and there in spaced relation to constitute stop means for the movement of the cover members to the open position, and rods extending between said strips and the outer members of the feed receptacles in spaced relation to the rear walls of the feed receptacles.

In testimony, that we claim the foregoing as our own, we have hereto affixed our signatures in the presence of two witnesses.

CLAIR C. CORFMAN.
JOSEPH C. CORFMAN.

Witnesses:
RUSSELL ULRICH,
CLOA STAUM.